United States Patent [19]

Thoms

[11] 4,272,965
[45] Jun. 16, 1981

[54] METHOD AND APPARATUS FOR CONTROLLING AND CONSERVING ENERGY IN AN ABSORPTION REFRIGERATION SYSTEM

[75] Inventor: Richard W. Thoms, Dickerson, Md.

[73] Assignee: Parklawn Associates, Inc., Rockville, Md.

[21] Appl. No.: 46,284

[22] Filed: Jun. 7, 1979

[51] Int. Cl.³ ............................................. F25B 15/00
[52] U.S. Cl. ........................................ 62/104; 62/148; 62/476
[58] Field of Search ........................... 62/104, 148, 476

[56] References Cited

U.S. PATENT DOCUMENTS

| | | | |
|---|---|---|---|
| 3,750,419 | 8/1973 | Bawel | 62/476 X |
| 3,837,174 | 9/1974 | Miyagi et al. | 62/476 X |
| 3,864,930 | 2/1975 | Hopkins | 62/148 X |
| 4,090,372 | 5/1978 | Lamb | 62/148 X |

Primary Examiner—Lloyd L. King

Attorney, Agent, or Firm—John J. Byrne

[57] ABSTRACT

A method and apparatus for conserving the amount of energy used to drive an absorption refrigeration generator while concomitantly insuring satisfaction of system load demands.

The system includes an absorption refrigeration generator having a concentrator section, a condenser section, an evaporator section and an absorber section wherein a heating medium, such as steam, is circulated through the concentrator section to vaporize refrigerant within the system and a closed loop, chilled water, heat exchange system is used to transfer cooling potential from the evaporator section to the system load, such as an office building. Control of the energy delivered to the concentrator for liberating refrigerant and thus providing cooling in the evaporator is achieved by sensing the temperature of the chilled water as it returns from the cooling load and modulating energy input to the concentrator to maintain a generally constant set temperature of the return chilled water.

8 Claims, 5 Drawing Figures

- CONCENTRATED SOLUTION
- DILUTE SOLUTION
- INTERMEDIATE SOLUTION
- REFRIGERANT

METHOD AND APPARATUS FOR CONTROLLING AND CONSERVING ENERGY IN AN ABSORPTION REFRIGERATION SYSTEM

BACKGROUND OF THE INVENTION

This invention relates to a method and apparatus for controlling and conserving energy utilized in an absorption refrigeration system. More specifically this invention relates to modulating heat input to an absorption concentrator by generally maintaining a set return chill water temperature.

Absorption refrigeration systems are typically used to cool large office buildings and the like. More specifically system chilled water is cooled by a central absorption generator unit. The chilled water is then circulated throughout a building and fed through cooling coil units mounted periodically in zone air ducting. Warm room air is drawn into the air ducting through a filter and the cooling coil where heat from the air is absorbed and transferred to the circulating chilled water. The cooled air is then blown back into the occupant zone to maintain a desired temperature level. The warmed system chilled water is returned to the absorption generator unit where heat is removed and transferred to a cooling tower and the chilled water is returned to the system cooling coils in a continuous closed loop process.

Absorption generator units typically comprise an enclosed cylindrical shell, which enhouses, in a closed refrigerant loop, a concentrator, a condenser, an evaporator and an absorber.

Briefly, an absorption cycle begins with a refrigerant, such as water, held in solution with a salt, such as lithium bromide, in the concentrator. This solution is selectively heated by, for example, piping steam or hot water through the solution. As the solution temperature rises, refrigerant water boils out of solution and is cooled and collected as a liquid in the condenser.

The condenser refrigerant is then fed into a low pressure evaporator chamber where the refrigerant water evaporates and absorbs heat from the surrounding environment. In this connection warm system chilled water returning from a cooling load is piped into the evaporator section through a heat exchange tubular bundle and back out for circulation to the external load in a closed loop. Heat is absorbed from the system chilled water in the evaporator in accordance with the latent heat of vaporization of a water refrigerant of approximately 1000 BTU per pound of refrigerant.

The refrigerant vapor generated in the evaporative cooling process spills downward into the absorber containing a salt solution of lithium bromide. The salt solution absorbs the refrigerant vapor liberating heat energy in the process. This heat is removed by water circulating from a cooling tower and the resultant solution of refrigerant and salt is then pumped into the concentrator and the process is repeated in a continuous closed loop.

Energy to drive the generator is input to the absorption unit via the concentrator and useful cooling work is performed by lowering the system chilled water temperature as it passes through the evaporator. Variation in cooling output can be achieved by regulating the energy input to the concentrator. In this regard if the temperature of the concentrated solution is increased more refrigerant will be liberated to be condensed and delivered to the evaporator.

Control of the absorption generator unit has been achieved in the past by maintaining a set temperature level of system chilled water leaving the evaporator. More specifically, chilled water temperature is monitored as it leaves the evaporator and is compared to a design set point. A valve which regulates steam input to the concentrator is then modulated in accordance with variations in the supply chilled water temperature from the design set point.

As previously indicated, chilled water is circulated through air handling units in a building and heat in the air is removed by a cooling coil supplied with the chilled water. The amount of chilled water that is circulated through the building is the amount that is required at the cooling coil to accomplish the maximum design cooling requirement at each of the air handling units.

When the cooling load is less than design peak (a condition that exists most of the time), the system will be providing more chilled water to the air handling unit than is required to satisfy the cooling load. Each air handling unit, however, is controlled by a thermostat which operates a chilled water bypass valve. In conditions of less than peak loading some of the supply water is diverted directly to the return and only part of the chilled water passes through the cooling coil.

The result of this method of control is to cause the chilled water supply temperature to remain essentially constant and to cause the chilled water return temperature to drop approaching the supply temperature as the cooling load is decreased. The energy effect of this type of control is to cause the energy consumption of the absorption generator unit to drop in direct relation to the machine output capacity, maintaining nearly constant energy consumption per ton of generator unit capacity.

Accordingly, it would be highly desirable to provide a method and apparatus for controlling an absorption generator unit where the machine energy consumption per ton of cooling output could be reduced at partial load conditions.

In addition conventional control systems frequently attempt to minimize energy consumption of an absorption generator by revising the set point of the leaving or supply chilled water temperature in accordance with variations in outside air temperature. Such conventional systems function adequately as long as the actual building load is equal to a design assumed load. However, if the actual building load exceeds the assumed load, then the supply water temperature that results from the reset controller will be too high. If the supply water temperature is too high, then the cooling coil will be unable to remove heat from the air and the actual cooling load of the building will never be transferred to the chilled water loop and, thus, will never be removed by the evaporator.

Since outside temperature typically affects only a small portion of a cooling load (30% in office buildings), the above situation may occur frequently. It would therefore also be desirable to provide a method and apparatus for controlling an absorption generator unit which would be suitable to take advantage of decreases in outside air temperature while concomitantly providing adequate cooling capability for a system load even when the system load exceeds assumed design values.

OBJECTS OF THE INVENTION

It is therefore a general object of the invention to provide a novel method and apparatus for controlling an absorption refrigeration generator which will obviate or minimize difficulties of the type previously described.

It is a specific object of the invention to provide a novel method and apparatus for controlling an absorption refrigeration generator wherein the machine energy consumption per ton of cooling output will be reduced at partial load conditions.

It is a related object of the invention to provide a novel method and apparatus for controlling an absorption refrigeration generator which will conserve energy while concomitantly meeting system cooling demands.

It is another object of the invention to provide a novel method and apparatus for controlling an absorption refrigeration generator wherein decreases in remote point temperature may be efficiently utilized to conserve energy utilized by the generator.

It is yet another object of the invention to provide a novel method and apparatus for controlling an absorption refrigeration generator wherein increases in cooling generation are matched to the time it takes for a given load to respond to a change in system chilled water temperature.

BRIEF SUMMARY OF THE INVENTION

A preferred embodiment of the invention, intended to accomplish at least some of the foregoing objects, comprises an absorption refrigeration system including a concentrator section, a condenser section, an evaporator section and an absorber section. A closed loop fluid path delivers a refrigerant from section to section wherein the refrigerant changes phase from a vapor to a liquid and a liquid to a vapor and provides cooling in the evaporator section in the process. A heating system is provided for selectively delivering heat energy to the concentrator section to vaporize the refrigerant. One or more control valves are connected to the heating system to regulate the rate of heat energy input to the condenser section and thus energy utilized to drive the absorption refrigeration process. A closed loop heat exchange bundle carries system chilled water through the evaporator for cooling and distribution to a system cooling load. A temperature sensing element is connected solely to the inlet portion of the closed loop heat exchange means for sensing the temperature of chilled water returning from the system load before the water enters the evaporator section. Means operably connect the temperature sensing element and the control valve for effecting modulation of energy input to the generator in response to the temperature of chilled water entering the evaporator section from the system cooling load.

THE DRAWINGS

Other objects and advantages of the present invention will become apparent from the following detailed description of a preferred embodiment thereof taken in conjunction with the accompanying drawings, wherein.

Figure 4:
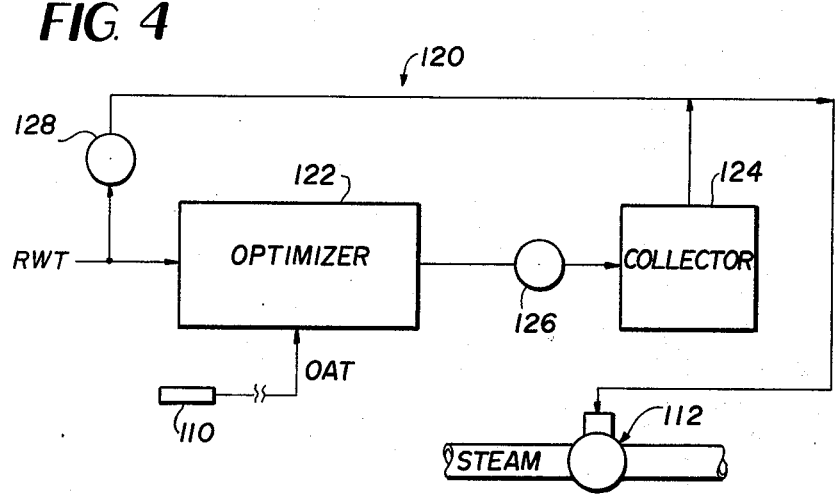
Figure 5:
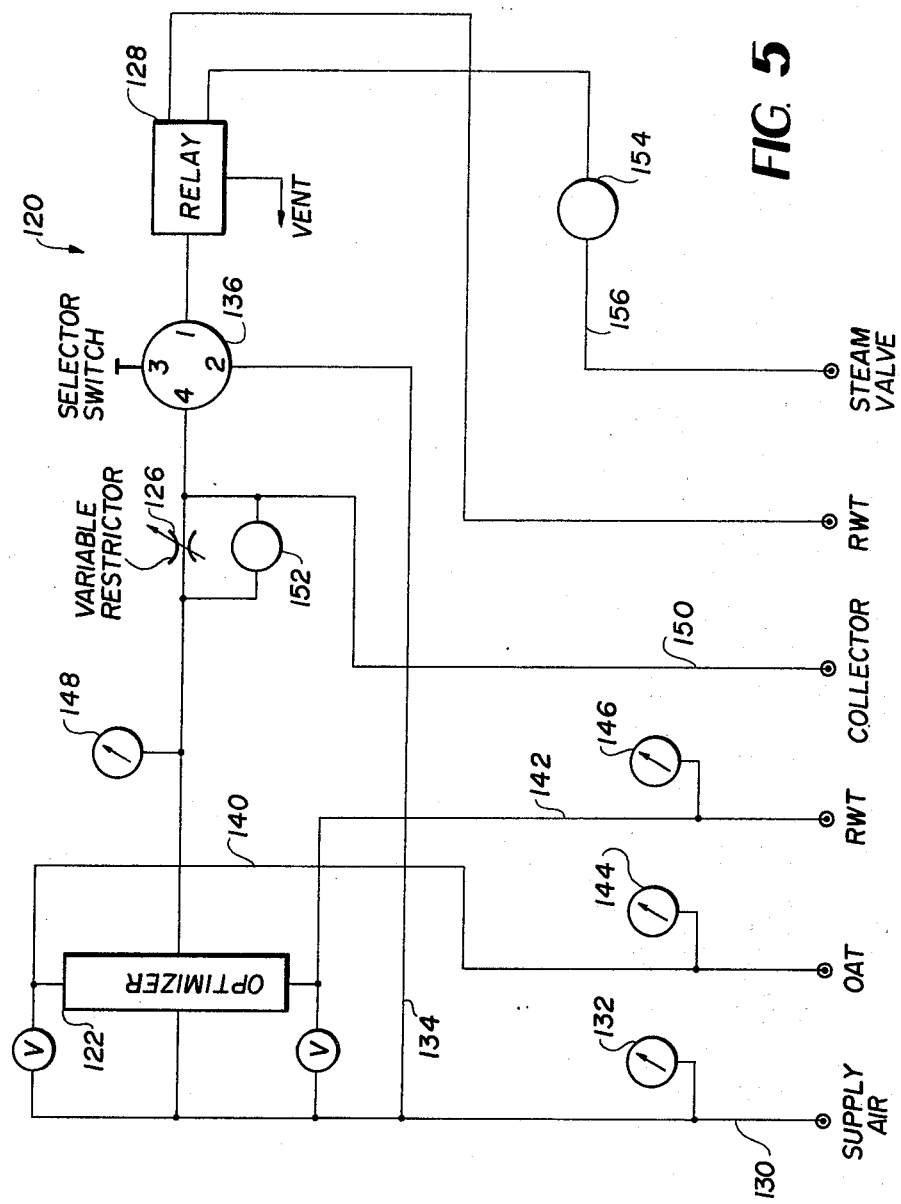

FIG. 4 is a diagram of a stability control system for modulating the chilled water return signal to enable the control system to accept remote point reset inputs from variable temperature points without causing stability problems in the generator operation; and FIG. 5 is a more detailed diagram of an air pressure optimizer system for regulating a steam control valve of an absorption generation unit.

DETAILED DESCRIPTION

Context of the Invention

Figure 1:
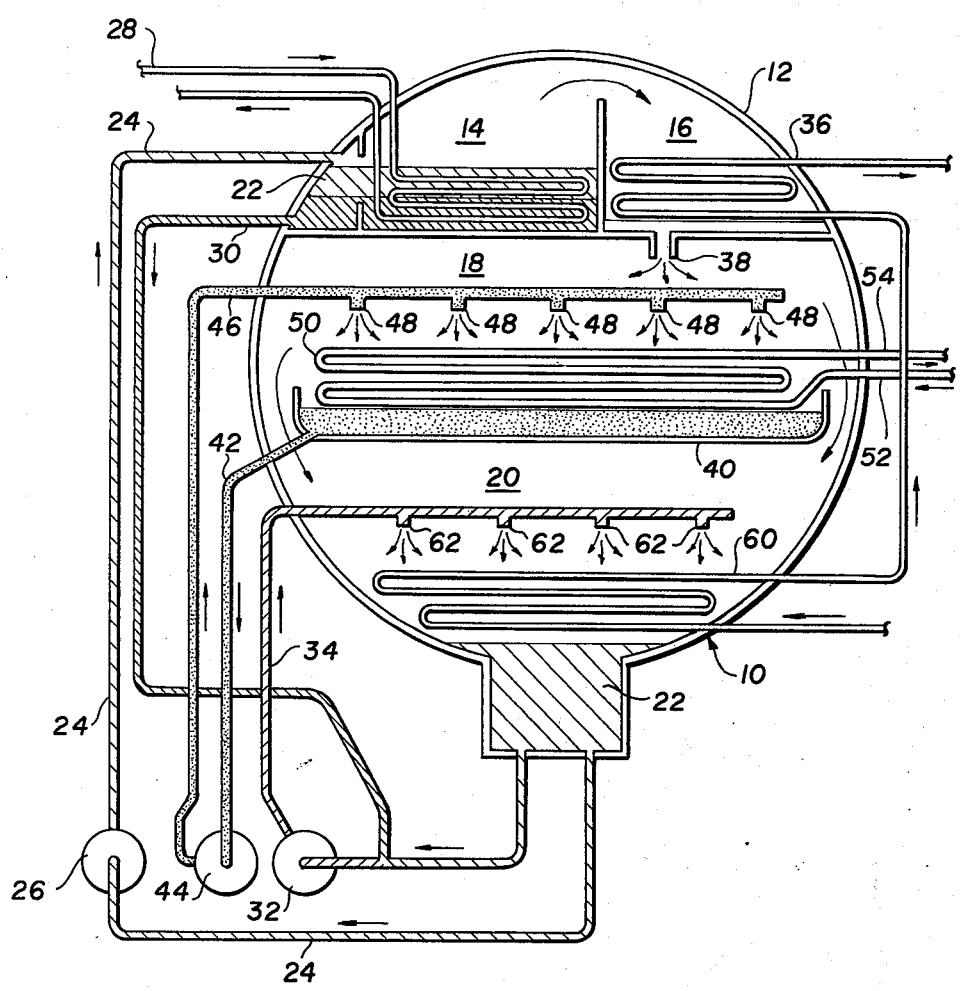
FIG. 1 is a schematic view of a conventional absorption generation unit including a concentrator section, a condenser section, an evaporator section and an absorber section.

Referring now to the drawings and particularly to FIG. 1 thereof there will be seen a schematic representation of an absorption refrigeration generator 10 embodying the operative environment of the invention. More specifically a generally cylindrical shell 12 serves to enhouse a concentrator section 14, a condenser section 16, an evaporator section 18 and an absorber section 20 of the generator unit 10.

Two working fluids are normally used in an absorption refrigeration system; a refrigerant, such as water, and an absorbent solution, such as lithium bromide. Water, as a refrigerant, possesses the advantageous characteristics of having a high latent heat of vaporization (1000 BTU/lb), being nontoxic and inexpensive and large quantities of water are readily absorbed and easily separated in an appropriate absorbent solution. The absorbent solution, such as lithium bromide, is selected to have a high affinity for the refrigerant and is used as a carrier vehicle for the refrigerant in the refrigeration process.

The absorbent and refrigerant fluids are mixed and separated within the machine as will be discussed more fully below from a dilute solution, with a relatively high refrigerant content and low absorbent content, to a strong solution wherein the relative concentrations are reversed, note the FIG. 1 schematic with concentration legends.

Returning to the generator structure, the concentrator section 14 receives a dilute solution 22 of the refrigerant, and salt from the absorbent section 20. The dilute solution 22 is pumped into a relative high pressure concentrator section 14 via a conduit 24 and pump 26. Heat or energy is input to the concentrator typically by a heat exchange conduit 28 connected to a conventional steam or hot water generation system, not shown. The heat energy is used in the concentrator section 14 to vaporize the refrigerant and separate it from the less volatile carrying salt. The vaporized refrigerant boils out of solution and passes into the condenser section 16 while the remaining salt solution becomes more concentrated and is delivered back to the absorption section 20 via conduit 30, pump 32 and conduit 34.

Vaporized refrigerant enters the relatively high pressure condensor section 16 and is cooled by a heat exchanger, tube bundle 36 which carries cooling fluid from a cooling tower. The cooled water vapor condenses into a liquid and settles to the bottom of the condenser section 16.

The condensed refrigerant then passes through an orifice 38 in the bottom of the condenser and into the relatively lower pressure evaporator section 18. Some of the water refrigerant "flashes" at the lower pressure, cooling the remainder of the refrigerant to evaporator temperature. The remainder of the refrigerant falls into an evaporator pan 40 where it is collected and pumped via conduit 42, pump 44 and conduit 46 to a plurality of nozzles 48 which spray the refrigerant over a heat exchanger, tubular bundle 50. The cold refrigerant then sprays on the tubular bundle 50, absorbs heat from warmer return chilled water within the tubular bundle and vaporizes. More specifically the refrigerant absorbs heat in changing phases in accordance with the latent heat of vaporization of the refrigerant (i.e. for water 1000 BTU/lb of water).

The tubular bundle 50 comprises one end of a closed loop chilled water distribution system wherein system water arrives at the tubular bundle inlet 52 at approximately 55 deg. F. and leaves at the heat exchanger outlet 54 at typically 45 deg. F. The chilled system water, at 45 deg. F. is then distributed to air handling units as will be discussed more fully in conjunction with FIG. 2 to provide system cooling as desired.

The low pressure vaporized refrigerant passes downward into the absorption section 20 where it is absorbed by the salt solution. As the vaporized refrigerant is absorbed it is also condensed thereby releasing the heat of vaporization. This heat is absorbed by a tubular heat exchange bundle 60 which is fed relatively cool water from a conventional cooling tower. In order to facilitate and enhance the absorption process the diluted salt solution 22 is continuously sprayed over the tubular bundle 60 via nozzles 62.

The refrigerant once absorbed is then pumped up to the concentrator section 14 and the cycle is continuously repeated wherein energy to drive the system is input via steam line 29 to the concentrator and useful cooling work is withdrawn from the generator unit by system supply water leaving the evaporator at 54.

In the past, as previously discussed, this absorption cycle has been controlled by monitoring the supply water temperature at 54 through a conventional temperature sensing unit and modulating a steam valve to maintain the supply water temperature at a set point such as for example, 45 deg. F. In this regard, the system load increased the returning chilled water would increase; thus, for the same cooling capability within the evaporator, the supply or outlet water temperature would increase. This increase would then be sensed and the steam valve would be opened to vaporize more refrigerant to provide more cooling capability in the evaporator section 18. As discussed, however, the temperature setting is maintained low enough to satisfy the maximum cooling requirement that occurs at the air handling units. When the cooling requirement at the air handling unit is less than design maximum, a room thermostat causes a chilled water control valve to divert some of the supply water to return. If the chilled water supply temperature remains essentially constant the chilled water return temperature will drop approaching the supply temperature as the building load decreases. The energy effect is to maintain nearly constant steam consumption per ton of machine capacity.

Control System

Figure 2:
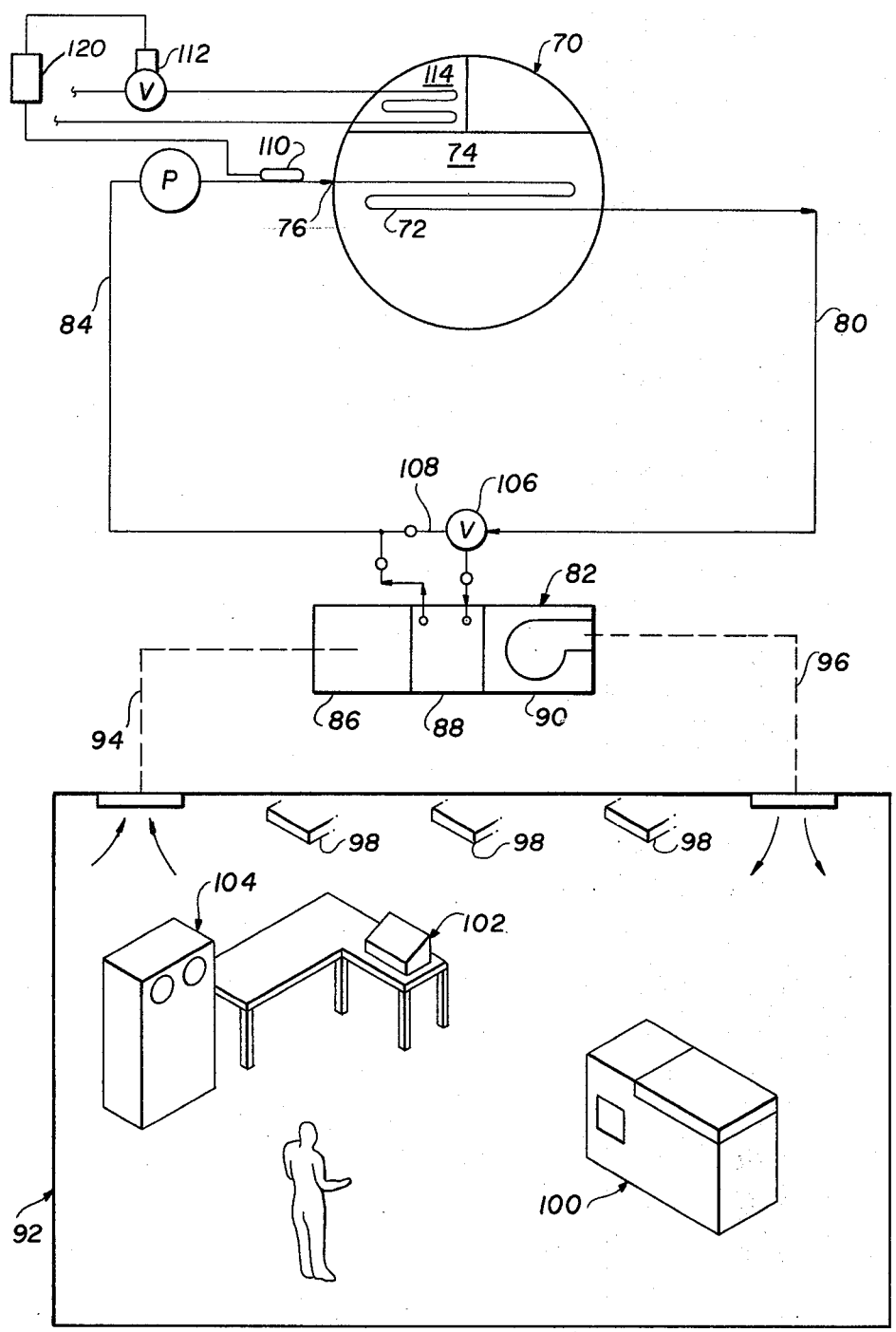
FIG. 2 is a schematic of a preferred embodiment of the invention including a cooling load zone, an absorption refrigeration generator, an air handling unit and wherein an energy input control valve is modulated in accordance with returning chilled water temperature.

Turning now to FIG. 2 there will be seen a preferred embodiment of the invention wherein a conventional absorption cold generator 70 is schematically depicted.

A more specific schematic description of the generator 70 has previously been provided in reference to FIG. 1.

A heat exchanger tubular bundle 72 lies within an evaporator section 74 of the generator 70 and receives return system chilled water at 76. The chilled water is cooled within the evaporator section 74 in the manner as previously discussed. The chilled system supply water is pumped via conduit 80 to one 82 of a plurality of air handling units and back to the evaporator via conduit 84.

Each air handling unit 82 typically includes a filter section 86, a cooling coil heat exchanger section 88 and a fan section 90.

Air to be cooled is drawn from a load zone 92 through a return air vent 94 and through the filter 86. The warm air is cooled as it passes through the cooling coil section 88 and is blown back into the load zone 92 through a supply conduit 96.

The temperature load on the zone is provided by lighting fixtures 98; various business machines such as a photocopier 100, a typewriter 102, a computer 104, etc.; and occupant loading. Additionally the cooling load may be increased by outside air temperature and solar loading.

Typical air handling units 82 also include a chilled water bypass system wherein a valve 106 is placed in the supply line 80 which serves to deliver chilled water to the cooling coil section 88 or divert the supply chilled water via bypass line 108 directly into the return conduit 84. The position of the valve 106 is modulated by a conventional thermostat (not shown) placed within the cooling load zone. When the cooling load on the zone decreases below design maximum (a condition which exists most of the time), a portion of the chilled water supply is automatically diverted directly into the return conduit.

The subject invention is directed away from the concept of maintaining chilled water supply at a constant cool temperature level but rather comprises maintaining chilled water return at a preset temperature level. In this connection a conventional temperature monitoring unit 110 is operably mounted to sense returning chilled water from the load zone prior to entry of the chilled water into the evaporator 74. Output from the temperature monitoring unit is used to modulate a steam valve 112 and thus control energy input to the system concentrator 114. Accordingly as the system load increases the returning chill water temperature will rise and the valve 112 will be opened to vaporize more refrigerant for use in reducing the supply chilled water temperature. When the system load decreases the returning chilled water in turn will decrease. Flow of steam through valve 112 will then be decreased so that less refrigerant is produced and the supply chilled water temperature will be permitted to rise. The energy effect of the subject invention is to allow the absorption generator machine to provide required cooling capacity at supply water temperatures higher than normal; thus the machine energy consumption per ton of output is reduced.

Reset Control

The conventional approach to resetting supply water temperature from outside air is to simply revise the set point of the leaving water temperature controller in accordance with outside air temperature. A typical reset schedule comprises the following:

| Outside Temp. | Assumed Load | Supply Water Temp. |
| --- | --- | --- |
| 95 deg. F. | 100% | 45 deg. F. |
| 85 deg. F. | 75% | 49 deg. F. |
| 75 deg. F. | 50% | 53 deg. F. |
| 65 deg. F. | 25% | 57 deg. F. |

This system will work as designed as long as the actual building load is equal to the assumed load. However, if the actual building load exceeds the assumed load, then the supply water temperature that results from the reset controller will be too high. If the supply water temperature is too high, then the cooling coil will be unable to remove heat from the air and the actual cooling load of the building will never be transferred to the chilled water loop.

Since outside temperature may affect only a small portion of the cooling load (approximately 30% in office buildings), the above situation may occur frequently.

In the subject invention instead of revising the set point of the supply chilled water temperature controller, outside temperature (or temperature from another remote point) is used to revise the return chilled water set point. By doing this, the outside temperature resets the control point by only 4 to 5 degrees F. instead of 13 to 14 degrees F. with conventional reset controls. The benefit of this approach occurs when a building load exceeds the assumed load.

The following is a typical reset schedule with the subject invention:

| Outside Temp. | Return Water Temp. |
| --- | --- |
| 95 deg. F. | 55 deg. F. |
| 85 deg. F. | 56.5 deg. F. |
| 75 deg. F. | 58 deg. F. |
| 65 deg. F. | 59.5 deg. F. |

The resulting supply water temperature will be a function of the evaporator load, as follows:

| OAT | RWT | Actual Load #1 | Actual SWT #1 | Actual Load #2 | Actual SWT #2 |
| --- | --- | --- | --- | --- | --- |
| 95 | 55.0 | 100% | 45 | 100% | 45 |
| 85 | 56.5 | 75% | 49 | 90% | 47.5 |
| 75 | 58.0 | 50% | 53 | 80% | 50.0 |
| 65 | 59.5 | 25% | 57 | 70% | 52.5 | where:
OAT = Outside Air Temperature in degrees F.
RWT = Return Water Temperature in degrees F.
SWT = Supply Water Temperature in degrees F.

Figure 3:
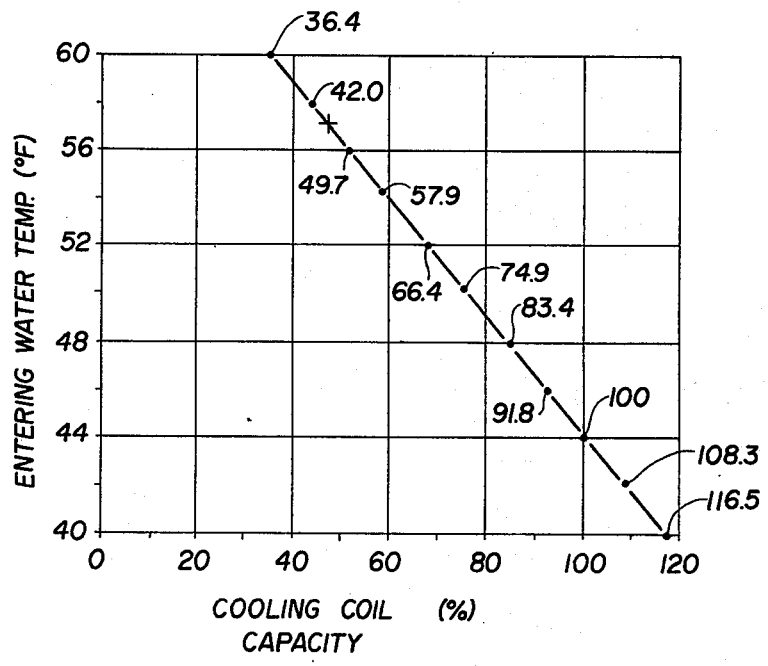
FIG. 3 is a diagram of supply chill water temperature vs. percentage of cooling coil capacity for a typical air handling unit.

An example of why the subject approach is advantageous over previously known means is seen by examining the chilled water system performance when outside temperature is 65 deg. F. and building load is 70%. The cooling coil capacity with 57 deg. F. supply water temperature is only 47% of design capacity as seen in FIG. 3. With a conventional system, 100% coil capacity is capable of producing a 10 degree F. temperature differential. Accordingly, the cooling coil can only raise the return water temperature 4.7 deg. F. above the supply temperature of 57 deg. F. at 65 deg. F. outside temperature. This is less than the required cooling capacity of the building and temperatures in the occupied space will not be maintained. To avoid this condition, conventional reset systems must be set up to produce colder supply water temperatures, thus limiting their ability to save energy.

With the subject system, return water will be controlled to 59.5 deg. F. when outside temperature is 65 deg. F. At 70% load, the chiller will produce a supply water temperature of 52.5 deg. F. If the cooling coil has the ability to raise the return water temperature above 59.5 deg. F. when supplied with 52.5 deg. F. chilled water, then the system will remain under control and the temperature in the occupied space will be maintained. As seen from FIG. 3, the cooling coil has 66.60 capacity at 52.5 deg. F. supply water temperature and thus the system remains under control.

With all proportional controls, it is possible for the machine to over react to changes in load. This is particularly true at increasing load conditions.

To eliminate this problem and the associated energy waste under these conditions, the output signal from the temperature sensor 110 is fed into an air pressure operated optimizer system 120 which operates the steam valve 112.

An optimizer 122 receives temperature signals from the chilled water return and outside air temperature and issues an appropriate air pressure signal taking into consideration the values of the temperature signals and design temperature set points. The intelligent air signal from the optimizer 122 passes into a collector 124 and through a variable restrictor 126, as shown diagramatically in FIG. 4. The effect of the variable restrictor is to allow a time lag between a change in the output signal of the optimizer, and a change in the position of the steam valve. The duration of this time lag is adjusted to equal the time it takes for the building to respond to a change in water temperature.

The optimizer system 120 is also provided with a bypass signal selector 128. The purpose of the signal selector 128 is to allow the time lag to be utilized only when the optimizer calls for an increase in load. When the optimizer calls for a decrease in load, the signal selector opens and allows the signal to bypass the air tank and restrictor. If the optimizer calls for an increase in capacity, the signal selector closes the bypass line requiring the signal to be delayed through the air tank 124 and resistor 126.

This additional stability feature makes it possible for the optimizer to accept reset inputs from variable temperature points (such as air unit supply temperature, outside air, etc.) without causing stability problems in the machine or system operation.

Referring now to FIG. 5 a more detailed schematic is disclosed of the optimizer system 120. More specifically compressed air is input to the control system via line 130. Air supply pressure may be visually monitored by a conventional pressure gauge 132 which is operable to be mounted upon a front control panel not shown.

Supply air pressure is fed into an initial branch conduit 134 and to a selector switch 136. This conduit and switch are utilized to bypass an optimizer unit 122 during servicing operations.

The optimizer 122 receives a pressure signal reflective of outside air temperature (OAT) or temperature from a preselected remote point via line 140. In a similar manner the optimizer received an air pressure signal reflective of return water temperature (RWT) as measured by sensor 110 via line 142. Both air pressure valves may be monitored by conventional air gauges 144 and 146 respectively. The optimizer 122 serves to modulate the return water signal in accordance with a remote point temperature reset schedule incorporated into the optimizer in a conventional manner. An example of an optimizer suitable for the instant purpose may be obtained from Johnson Controls, Inc. of Milwaukee, Wis., part No. T5303-32.

Output from the optimizer is monitored via gauge 148 and fed through a variable restrictor 126 as previously mentioned in connection with FIG. 4 and into a collector tank via line 150.

A pressure regulator 152 is mounted in parallel with the variable restrictor 126 to regulate pressure during startup operations.

The modulated air pressure signal is fed from the variable restrictor and collector into relay 128 and through a demand limiter 154 to the steam valve 112 via line 156. In addition a return water temperature signal is input from sensor 110 into the relay 128 and on to the steam valve via line 156. The relay 128 is set such that during periods of increasing load the optimizer circuit is functional to gradually modulate the steam supply upward. During periods of decreasing load, however, the optimizer is bypassed, the RWT signal is input directly to the steam valve to rapidly decrease steam supply as previously indicated.

In describing the invention, reference has been made to a preferred embodiment. Those skilled in the art, however, and familiar with the disclosure of the subject invention, may recognize additions, deletions, modifications, substitutions and/or other changes which will fall within the purview of the subject invention.

What I claim is:

1. In an absorption refrigeration system including a concentrator section, a condenser section, an evaporator section and an absorber section, and a closed loop fluid path for delivering a refrigerant from section to section and changing phases of the refrigerant from a vapor to a liquid and a liquid to a vapor and providing cooling in the evaporator section in the process, means for delivering heat energy to said concentrator section to vaporize the refrigerant, control means connected to said means for delivering heat energy to regulate the rate of heat energy delivered to the condenser section and thus energy utilized to drive the absorption refrigeration system, closed loop heat exchange means carrying chilled water for distribution to a system load to be cooled and including an inlet portion carrying chilled water returning from the system load, and an outlet portion leaving said evaporator section for carrying chilled water cooled in the evaporator to the system load to be cooled, wherein the improvement comprises:
   temperature sensing means connected exclusively to the inlet portion of said closed loop heat exchange means for sensing the temperature of chilled water returning from the systemm load before entering said evaporator section; and
   means operably connecting said temperature sensing means and said control means for effecting regulation of said control means in response to the temperature of chilled water entering the refrigeration system evaporator section from the system load and irrespective of the temperature of chilled water leaving the refrigeration system evaporator section.

2. In an absorption refrigeration system including a concentrator section, a condenser section, an evaporator section and an absorber section, and a closed loop fluid path for delivering a refrigerant from section to section and changing phases of the refrigerant from a vapor to a liquid and a liquid to a vapor and providing cooling in the evaporator section in the process, means for delivering heat energy to said concentrator section to vaporize the refrigerant, control means connected to said means for delivering heat energy to regulate the rate of heat energy delivered to the condenser section and thus energy utilized to drive the absorption refrigeration system, closed loop heat exchange means carrying chilled water for distribution to a system load to be cooled and including an inlet portion carrying chilled water returning from the system load, and an outlet portion leaving said evaporator section for carrying chilled water cooled in the evaporator to the system load to be colled, wherein the improvement comprises:
   temperature sensing means connecting exclusively to the inlet portion of said closed loop heat exchange means for sensing the temperature of chilled water returning from the system load before entering said evaporator section;
   means operably connecting said temperature sensing means and said control means for effecting regulation of said control means in response to the temperature of chilled water entering the refrigeration system evaporator section from the system load;
   means for determining remote point air temperature adjacent the system load to be cooled;
   temperature reset means operably connected to said control means for resetting the temperature signal received from said temperature sensing means connected exclusively to the inlet portion of said close loop heat exchange means; and
   means connecting said temperature reset means to said means for determining remote point air temperature.

3. In an absorption refrigeration system as defined in claim 2 and further comprising:
   time delay means interposed between said temperature reset means and said control means or delaying the input signal received from said temperature sensing means as modulated by said temperature reset means.

4. In an absorption refrigeration system as defined in claim 3 and further comprising:
   signal selector means mounted in parallel with said time delay means for bypassing said time delay means when said temperature sensing means and said temperature reset signal means call for a decrease in cooling input to the system load to be cooled.

5. A method for controlling and conserving energy utilization in an absorption refrigeration system including a concentrator section, a condenser section, and evaporator section and an absorber section, and a closed loop fluid path for delivering a refrigerant from section to section and changing phases of the refrigerant from a vapor to a liquid and a liquid to a vapor and providing cooling in the evaporator section in the process, means for delivering heat energy to said concentrator section to vaporize the refrigerant in the concentrator for delivery of the vaporized refrigerant to the condenser, control means connected to said means for delivering heat energy to regulate the rate of heat energy input to the concentrator section and thus energy utilized to drive the absorption refrigeration system, close loop heat exchange means carrying chilled water for distribution to a system load to be cooled and including an inlet section carrying chilled water returning from the system load and an outlet section leaving said evaporator section for carrying chilled water cooled in the evaporator system to the system load to be cooled, wherein the improvement comprises the steps of:

sensing the temperature of chilled water exclusively as the water returns from the system load to be cooled before the chilled water enters the evaporator; and controlling the amount of heat energy delivered to the concentrator section as a function of the temperature of the returning chilled water coming from the system load to be cooled irrespective of the temperature of the chilled water leaving the refrigeration system evaporator section.

6. A method for controlling and conserving energy utilization in an absorption refrigeration system including a concentrator section, a condenser section, and evaporator section and an absorber section, and a closed loop fluid path for delivering a refrigerant from section to section and changing phases of the refrigerant from a vapor to a liquid and a liquid to a vapor and providing cooling in the evaporator section in the process, means for delivering heat energy to said concentrator section to vaporize the refrigerant in the concentrator for delivery of the vaporized refrigerant to the condenser, control means connected to said means for delivering heat energy to regulate the rate of heat energy input to the concentrator section and thus energy uitlized to drive the absorption refrigeration system, close loop heat exchange means carrying chilled water for distribution to a system load to be colled and including an inlet section carrying chilled water returning from the system load and an outlet section leaving said evaporator section for carrying chilled water cooled in the evaporator system to the system load to be cooled, wherein the improvement comprises the steps of:

sensing the temperature of chilled water exclusively as the water returns from the system load to be cooled before the chilled water enters the evaporator;

controlling the amount of heat energy delivered to the concentrator section as a function of the temperature of the returning chilled water coming from the system load to be cooled;

monitoring air temperature at a point remote from the system load to be cooled; and modulating the signal carrying the return chilled water temperature information as a function of said air temperature.

7. A method for controlling and conserving energy utilization in an absorption refrigeration system as defined in claim 6 and further comprising the steps of:

delaying transmission of the signal carrying the temperature of the return chilled water and the temperature reset signal prior to input of said information to the heat energy control means.

8. A method for controlling and conserving energy utilization in an absorption refrigeration system as defined in claim 7 and further comprising the step of:

selectively eliminating said step of delaying when the chilled water temperature signal and remote point air reset signal call for a decrease in cooling requirement to be input to the system load.

* * * * *